(12) United States Patent
Griffin et al.

(10) Patent No.: US 7,681,890 B2
(45) Date of Patent: Mar. 23, 2010

(54) GASKET

(75) Inventors: Gregory A. Griffin, Glendale Heights, IL (US); Craig R. Knauf, Stoughton, WI (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 1119 days.

(21) Appl. No.: 10/777,745

(22) Filed: Feb. 12, 2004

(65) Prior Publication Data

US 2005/0179212 A1    Aug. 18, 2005

(51) Int. Cl.
*F02F 11/00*    (2006.01)
(52) U.S. Cl. ........................... 277/592; 277/594
(58) Field of Classification Search ......... 277/591–595, 277/598
See application file for complete search history.

(56) References Cited

U.S. PATENT DOCUMENTS

| | | | | |
|---|---|---|---|---|
| 2,795,444 A | * | 6/1957 | Nenzell | 411/542 |
| 3,811,689 A | * | 5/1974 | Famam | 277/637 |
| 4,819,954 A | * | 4/1989 | Fucci et al. | 277/598 |
| 5,618,047 A | * | 4/1997 | Belter | 277/632 |
| 5,645,282 A | * | 7/1997 | Belter | 277/598 |
| 5,673,920 A | * | 10/1997 | Mockenhaupt | 277/630 |
| 6,543,787 B1 | * | 4/2003 | Inciong | 277/593 |
| 6,553,664 B1 | * | 4/2003 | Schenk | 29/888.3 |
| 2003/0102636 A1 | * | 6/2003 | Belter | 277/591 |
| 2003/0201611 A1 | * | 10/2003 | Schenk | 277/591 |

* cited by examiner

*Primary Examiner*—Vishal Patel
(74) *Attorney, Agent, or Firm*—Jack D. Nimz; Jeffrey P. Calfa

(57) ABSTRACT

A gasket (201) includes one or more elastomeric sections (301, 305, 307) disposed on a metal substrate (303). An elastomeric ring (307) has an inner diameter (309) that is smaller than an outer diameter of a fastener (205). When the fastener (205) is inserted into the ring (307), the fastener (205) and gasket (201) are retained to each other. When a flange (101) for a device, such as an oil pick-up tube (100), is disposed between the fastener (205) and the gasket (201), the gasket (201) and fastener (205) are retained to the flange (101).

19 Claims, 2 Drawing Sheets

GASKET

FIELD OF THE INVENTION

This invention relates to gaskets, including but not limited to, gaskets comprising metal and elastomeric components.

BACKGROUND OF THE INVENTION

Oil pick-up tubes are often attached to the front cover of an engine with a gasket disposed between them. Bolts are typically inserted through the front cover and the gasket hangs on the fasteners, until the fasteners are inserted in the taps in the flange on the oil pick-up tube.

As various parts of the engine are redesigned to meet design needs, engine geometries may not permit through-holes to be formed in the front cover. Instead, the through-holes need to be formed on the flange of the oil pick-up tube, while the front cover is tapped for fastener insertion. As a result, however, the gasket, fasteners, and oil pick-up tube need to be assembled, and the assembly is then installed on the front cover. One or more fasteners and/or the gasket may fall off the assembly prior to installation, requiring reassembly or resulting in a gasket not being installed. Further, such installation is difficult to accomplish with only two hands, when one hand is needed to handle the tool that drives the fasteners.

Accordingly, there is a need for a reliable method of installing a device with a gasket when the through-holes are formed in the device, such as an oil pick-up tube.

SUMMARY OF THE INVENTION

A gasket comprises a metal substrate disposed along an outer perimeter of the gasket and an elastomeric bead disposed along at least a part of an interior perimeter of the metal substrate. An elastomeric ring is disposed along the metal substrate. The elastomeric ring has an inner diameter that is smaller than an outer diameter of a fastener.

DESCRIPTION OF A PREFERRED EMBODIMENT

The following describes a self-retaining gasket and method of utilizing it in installation. The self-retaining gasket includes one or more elastomeric sections disposed on a metal substrate. An elastomeric ring has an inner diameter that is smaller than an outer diameter of a fastener. When the fastener is inserted into the ring, the fastener and gasket are retained to each other. When a flange for a device, such as an oil pick-up tube, is disposed between the fastener and the gasket, the gasket and fastener are retained to the flange, thereby providing easier and more reliable installation.

Figure 1:
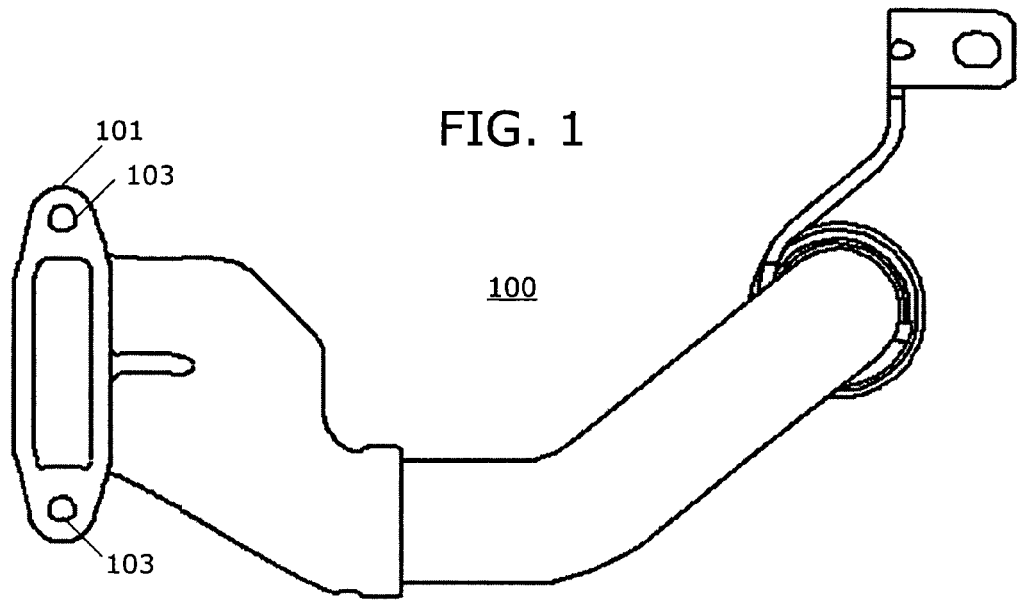
FIG. 1 is a top view of a flange of an oil pick-up tube in accordance with the invention.

A top view of a flange 101 of an oil pick-up tube 100 is shown in FIG. 1. The flange is shown with two fastener holes to facilitate installation of the oil pick-up tube 100 with two fasteners to an engine, for example, to the front cover of an engine.

Figure 2:
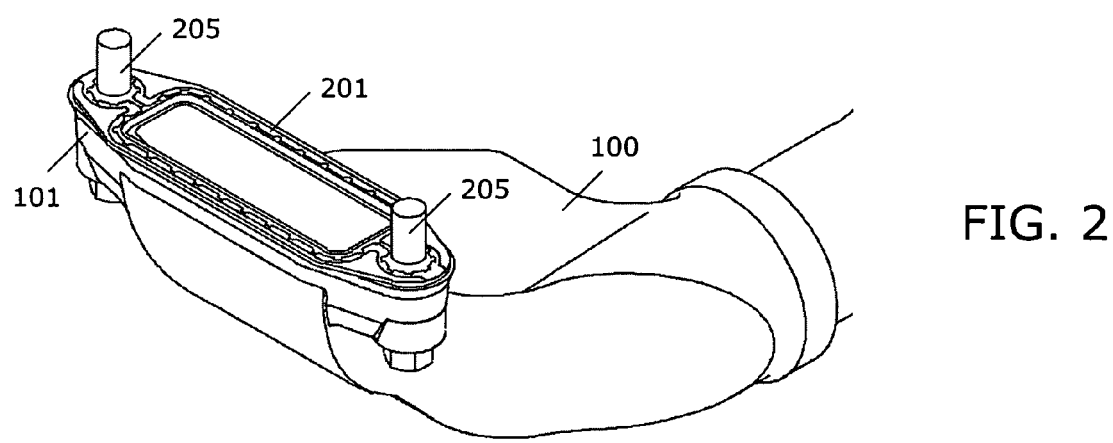
FIG. 2 is a perspective view of a self-retaining gasket disposed on a flange of a tube in accordance with the invention.

A perspective view of a self-retaining gasket 201 disposed on a flange 101 of a tube 100 is shown in FIG. 2. The self-retaining gasket 201 is shown having an outer perimeter with the same shape as the outer perimeter of the flange 101. An inner perimeter of the gasket 201 is shown with the same shape as the inner perimeter of the flange 101. The perimeter shapes of the gasket 201 need not match the perimeter shapes of the flange 101 as long as the desired characteristics, e.g., sealing and/or fastener retention, of the gasket 201 are achieved. Two fasteners 205, such as bolts, studs, and so forth, are shown inserted through the fastener holes 103 of the flange 101 and through rings 307 (see FIG. 3) disposed at either end of the gasket 201.

Figure 3:
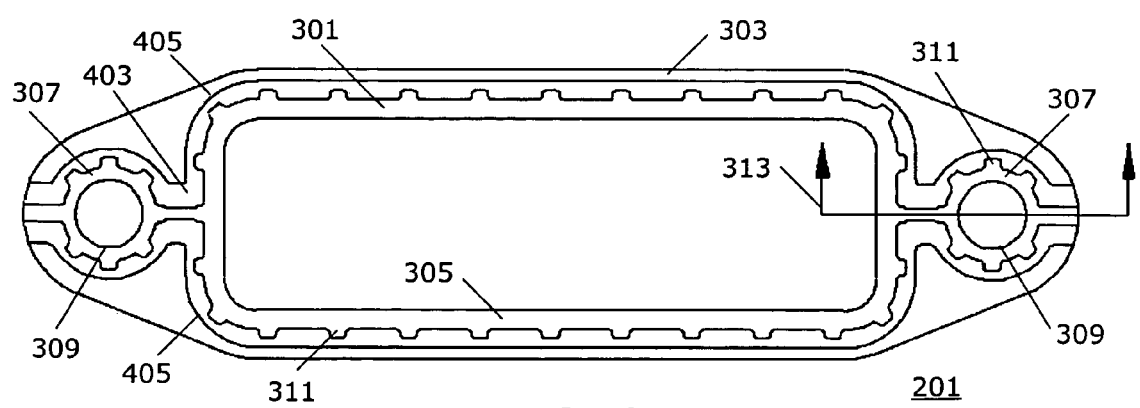
FIG. 3 is a top view of a self-retaining gasket in accordance with the invention.

A top view of a self-retaining gasket is shown in FIG. 3. The gasket 201 comprises elastomeric material 301 disposed on a metal substrate 303 that is described in more detail with respect to FIG. 4. The elastomer 301 includes a bead 305 that extends away from the plane of the metal substrate 303, as shown in FIG. 5, generally providing a sealing function. As shown in FIG. 3, the elastomeric bead 305 forms the inner perimeter of elastomer 301 of the gasket 201. One or more elastomeric ring(s) 307 are formed to substantially align with the fastener hole(s) 103 of the flange 101. The elastomeric bead 305 and the elastomeric ring(s) 307 may be formed as one continuous elastomer or they may each be formed in separate sections. The elastomeric material 301 may be, for example, rubber.

An elastomeric ring 307 is shown formed at each end of the gasket 201. A ring 307 is advantageously formed for each fastener 205, although sufficient retention may be achieved with one or more rings 307 depending on the flange 101 and/or how many fasteners 205 are utilized. Each ring 307 has an inner diameter 309 that is smaller than the outer diameter of the section of the fastener 205 that will be inserted through the ring 307. By utilizing an inner diameter 309 that is smaller than the outer diameter of the fastener 205, the fastener 205 forms an interference fit with the ring 307, causing the fastener 205 to be retained with the gasket 201, for example, during installation. Advantageously, the size of the inner diameter 309 is chosen such that the fasteners 205 are retained with the gasket without damaging the gasket during insertion of the fasteners 205.

When the two fasteners 205 are inserted through the fastener holes 103 of the flange 101 and the elastomeric rings 307, the gasket 201 and the fasteners 205 are retained with the flange 101, thereby facilitating easier installation. One person is only needed for installation, because the person can hold the device with the gasket 201 and fasteners 205 in one hand and the tool for driving the fasteners in the other hand. As a result, the installer need not worry about the gasket 201 or fasteners 205 falling off during installation.

A plurality of "teeth" 311 are formed along the outer perimeter of the elastomeric 301 to advantageously provide better grip between the elastomeric 301 and the metal substrate 303 at the inner perimeter of the metal substrate 303. The teeth 311 may be formed along the bead 305 and/or the ring(s) 307.

Figure 4:
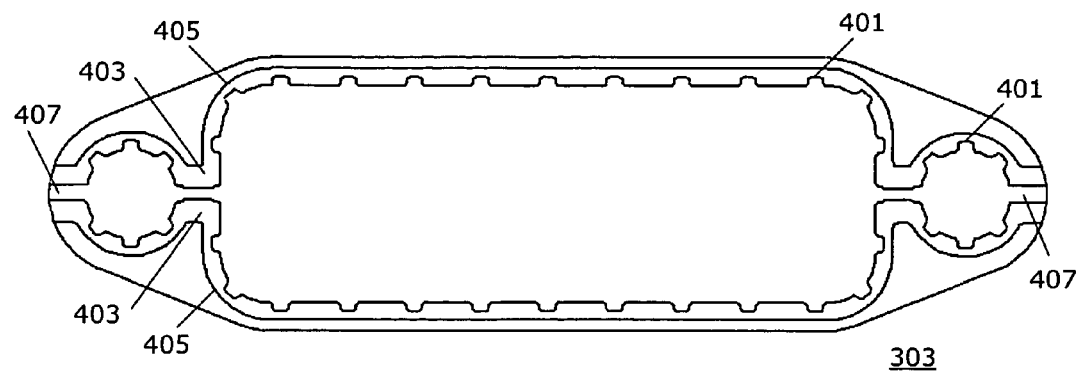
FIG. 4 is a top view of a metal substrate of a self-retaining gasket in accordance with the invention.
Figure 5:
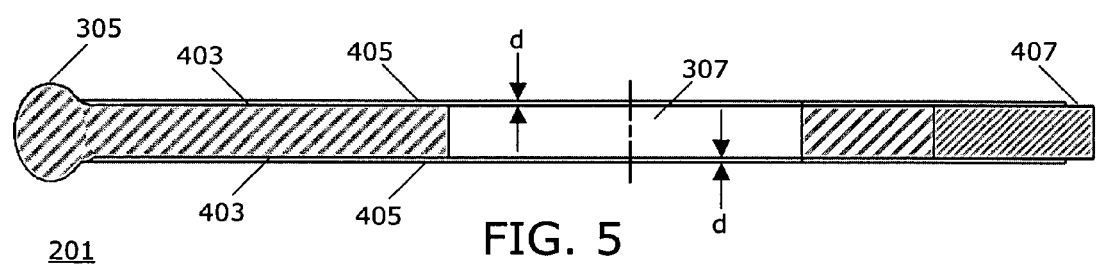
FIG. 5 is a cross-sectional view of a self-retaining gasket in accordance with the invention.

A top view of a metal substrate 303 of a self-retaining gasket 201 is shown in FIG. 4. A plurality of grooves 401 are shown formed along the inner perimeter of the metal substrate 303. Although the grooves 401 are shown in a generally rectangular shape, they may be formed in other shapes, including triangular and curved. A depression 403 surrounds the inner perimeter and is bordered by an edge 405. One or more troughs or channels 407 may be formed along the outer perimeter of the metal substrate 303 to facilitate injection molding of the elastomer 301. The depression 403 provides an area for overfill of the elastomer 301 from an injection molding process.

A cross-sectional view of a self-retaining gasket 201 is shown in FIG. 5. The cross-section is shown through the section line 313 of FIG. 3. The elastomeric bead 305 is shown at one end of the cross-section interior to the depression 403. The elastomeric bead 305 is shown extending away from the metal substrate 303 vertically in both directions and horizontally in one direction. The depression 403 may, for example, have a depth, d, of 0.003 inches. The gasket 201 is shown vertically symmetrical, although the gasket 201 need not be symmetrical, vertically, horizontally, or otherwise, for all applications.

Figure 6:
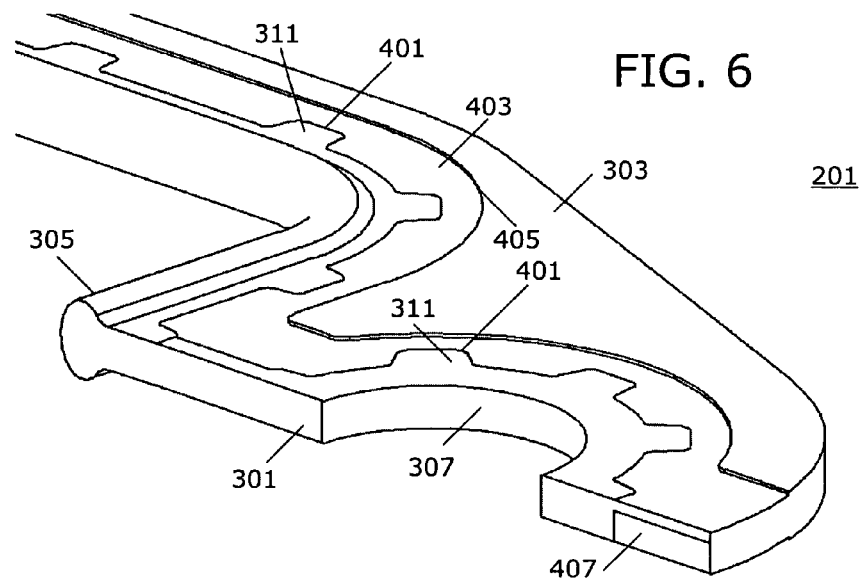
FIG. 6 is a perspective view of a partial cross-section of a self-retaining gasket in accordance with the invention.

A perspective view of a partial cross-section of a self-retaining gasket 201 is shown in FIG. 6. Although the elastomeric bead 305 is shown over a part of the inner perimeter of the elastomer 301, the elastomeric bead 305 advantageously extends completely around the inner perimeter of the elastomer 301. The cross-section is taken along the section line 313 of FIG. 3. The teeth 311 of the elastomer 301 are shown corresponding to the grooves 401 of the metal substrate 303. Elastomer 301 is shown formed above the channel 407 after the molding process.

The present invention provides numerous advantages. A gasket and one or more fasteners may be retained with a flange during the installation process, thereby reducing the need to reassemble because the gaskets and/or fasteners do not readily fall off the flange. The flange may be attached to many types of devices, including tubes, such as oil pick-up tubes. The self-retention feature facilitates a single person installing the device, because only one hand is needed to hold device, freeing the other hand for operation of a tool to drive the fastener(s). Assembly time is thereby reduced. The gasket may be reusable if, when removed from the flange, the gasket is not damaged, thereby saving in service costs.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A gasket comprising:
    a metal substrate disposed along an outer perimeter of the gasket;
    an elastomeric bead disposed along at least a part of an interior perimeter of the metal substrate;
    an elastomeric ring disposed around an opening of the metal substrate, wherein the elastomeric ring has an inner diameter, wherein the opening has an opening diameter, and wherein the inner diameter of the elastomeric ring is smaller than the opening diameter of the opening;
    wherein the inner diameter is smaller than an outer diameter of a fastener that is disposable in the opening, such that the fastener is retained with the gasket when the fastener is inserted in the elastomeric ring by radially compressing the elastomeric ring between the fastener and the opening.

2. The gasket of claim 1, wherein a plurality of teeth disposed along an outer perimeter of the elastomeric bead correspond with a plurality of grooves disposed along at least a section of the interior perimeter of the metal substrate.

3. The gasket of claim 1, wherein a plurality of teeth disposed along an outer perimeter of the elastomeric ring correspond with a plurality of grooves disposed along at least a segment of the interior perimeter of the metal substrate.

4. The gasket of claim 1, wherein the elastomeric bead and the elastomeric ring are formed of a continuous rubber material that is formed on the metal substrate.

5. The gasket of claim 1, wherein the inner diameter of the elastomeric ring is smaller than an inner diameter of an opening formed the metal substrate into which opening the elastomeric ring extends.

6. The gasket of claim 1, wherein the elastomeric ring extends radially inwardly of the opening in the metal substrate.

7. The gasket of claim 1, wherein the inner diameter of the elastomeric ring forms an interference fit with the fastener.

8. The gasket of claim 1, wherein the gasket is capable of fitting to a flange having a fastener hole, such that when the fastener is inserted through the fastener hole and the elastomeric ring, the gasket and fastener are sufficiently attached to the flange to permit installation of the fastener without the gasket and fastener falling off the flange.

9. The gasket of claim 8, wherein the gasket is disposable between an engine cover and an oil pick-up tube attached to the flange.

10. A gasket comprising:
    a metal substrate disposed along an outer perimeter of the gasket, wherein the metal substrate has a plurality of grooves disposed along an interior perimeter of the metal substrate and an inner diameter of a fastener opening; wherein the fastener opening is arranged and constructed to accommodate a fastener having an outer shaft diameter, wherein the outer shaft diameter is smaller than the inner diameter of the fastener opening;
    an elastomer comprising a bead disposed along an interior perimeter of the elastomer and a ring disposed along the inner diameter of the fastener opening, wherein a plurality of teeth are formed along an outer perimeter of the elastomer, wherein the plurality of teeth are formed in the plurality of grooves, and wherein the ring has an inner diameter that is smaller than both the inner diameter of the fastener opening and the outer shaft diameter of the fastener, such that the fastener is retained with the gasket when the fastener is inserted in the elastomeric ring.

11. The gasket of claim 10, further comprising a depression formed in the metal substrate.

12. The gasket of claim 10, wherein the gasket is capable of fitting to a flange having a fastener hole, such that when the fastener is inserted through the fastener hole and the ring, the gasket and fastener are sufficiently attached to the flange to permit installation of the fastener without the gasket and fastener falling off the flange.

13. The gasket of claim 10, wherein the gasket is disposable between an engine cover and an oil pick-up tube attached to the flange.

14. The gasket of claim 10, wherein the inner diameter of the ring forms an interference fit with the fastener.

15. A gasket comprising:

a metal substrate disposed along an outer perimeter of the gasket, wherein the metal substrate has a plurality of grooves disposed along an interior perimeter of the metal substrate and along an inner diameter of a fastener opening, wherein the fastener opening is sized to cooperate with a specific fastener, such that the specific fastener has an outer shaft diameter, and the inner diameter of the fastener opening is larger than the outer shaft diameter;

an elastomeric bead comprising a plurality of teeth disposed along an outer perimeter of the elastomeric bead, wherein the elastomeric bead is disposed along the interior perimeter of the metal substrate, and wherein the plurality of teeth are disposed in same of the plurality of grooves;

a first elastomeric ring comprising at least two teeth disposed along an outer perimeter of the first elastomeric ring, wherein the first elastomeric ring is disposed in the fastener opening and near a first end of the metal substrate, wherein the at least two teeth are disposed in at least two of the plurality of grooves, and wherein the first elastomeric ring has an inner ring diameter that is smaller than the outer shaft diameter;

a second elastomeric ring comprising two or more teeth disposed along an outer perimeter of the second elastomeric ring, wherein the second elastomeric ring is disposed in an additional fastener opening that is near a second end of the metal substrate, wherein the two or more teeth are disposed in two or more of the plurality of grooves, and wherein the second elastomeric ring has an additional inner ring diameter that is smaller than an additional outer shaft diameter of an additional fastener.

16. The gasket of claim 15, wherein the elastomeric bead, the first elastomeric ring, and the second elastomeric ring, are formed of a continuous rubber material that is formed on the metal substrate.

17. The gasket of claim 15, further comprising a depression formed in the metal substrate.

18. The gasket of claim 15, wherein the gasket is capable of fitting to a flange having a first fastener hole and a second fastener hole, such that when the fastener is inserted through the first fastener hole and the first elastomeric ring and the additional fastener is inserted through the second fastener hole and the second elastomeric ring, the gasket, the first fastener, and the additional fastener are sufficiently attached to the flange to permit installation of the first fastener and the additional fastener without the gasket and first fastener and the additional fastener falling off the flange.

19. The gasket of claim 18, wherein the gasket is disposable between an engine cover and an oil pick-up tube attached to the flange.

* * * * *